United States Patent
Mercuri

(10) Patent No.: US 11,115,804 B2
(45) Date of Patent: Sep. 7, 2021

(54) SUBSCRIPTION TO DEPENDENCIES IN SMART CONTRACTS

(71) Applicant: Microsoft Technology Licensing, LLC, Redmond, WA (US)

(72) Inventor: Marc Edward Mercuri, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 16/593,902

(22) Filed: Oct. 4, 2019

(65) Prior Publication Data
US 2021/0105608 A1 Apr. 8, 2021

(51) Int. Cl.
| | |
|---|---|
| *H04W 4/80* | (2018.01) |
| *H04W 8/18* | (2009.01) |
| *H04L 9/06* | (2006.01) |
| *H04L 12/26* | (2006.01) |
| *H04W 8/20* | (2009.01) |

(52) U.S. Cl.
CPC ........... *H04W 8/186* (2013.01); *H04L 9/0643* (2013.01); *H04L 43/08* (2013.01); *H04W 4/80* (2018.02); *H04W 8/20* (2013.01); *H04L 2209/38* (2013.01)

(58) Field of Classification Search
CPC ........ H04W 8/186; H04W 8/20; H04W 4/80; H04L 43/08; H04L 9/0643; H04L 2209/38
See application file for complete search history.

(56) References Cited

U.S. PATENT DOCUMENTS

| | | |
|---|---|---|
| 9,774,578 B1 | 9/2017 | Ateniese et al. |
| 2011/0136471 A1* | 6/2011 | Chen .................... H04W 12/06 455/411 |

(Continued)

FOREIGN PATENT DOCUMENTS

| | | |
|---|---|---|
| CN | 109451061 A | 3/2019 |
| WO | 2018026883 A1 | 2/2018 |
| WO | 2018172439 A1 | 9/2018 |

OTHER PUBLICATIONS

"Non Final Office Action Issued in U.S. Appl. No. 16/434,510", dated Nov. 19, 2020, 22 Pages.
(Continued)

*Primary Examiner* — Michael J Moore, Jr.
*Assistant Examiner* — Prenell P Jones
(74) *Attorney, Agent, or Firm* — Davin Chin; Chin IP, PLLC

(57) ABSTRACT

The disclosed technology is generally directed to smart contract technology. In one example of the technology, responsive to a smart contract subscription request from a requestor to a first smart contract, a registry entry is added to a first smart contract registry such that the added registry entry includes requestor information associated with the requestor, and subscription information associated with at least one exposed interface of the first smart contract. Responsive to a change occurring that is associated with at least one exposed interface of the first smart contract, based on the registry, any subscribers to the first smart contract that have a subscription to which the change pertains are determined. Responsive to determining subscribers to the first smart contract that have a subscription to which the change pertains, the determined subscribers are caused to be notified of the change.

20 Claims, 8 Drawing Sheets

(56) References Cited

U.S. PATENT DOCUMENTS

| | | | |
|---|---|---|---|
| 2012/0102556 A1* | 4/2012 | Tapia | H04W 12/06 |
| | | | 726/7 |
| 2017/0230189 A1 | 8/2017 | Toll et al. | |
| 2017/0289790 A1* | 10/2017 | Singh | H04W 8/183 |
| 2018/0025365 A1 | 1/2018 | Wilkinson et al. | |
| 2018/0025442 A1* | 1/2018 | Isaacson | G06F 3/048 |
| | | | 705/26.62 |
| 2018/0046889 A1 | 2/2018 | Kapinos et al. | |
| 2018/0117447 A1* | 5/2018 | Tran | G16H 10/60 |
| 2018/0174188 A1 | 6/2018 | Wilkinson et al. | |
| 2018/0294977 A1 | 10/2018 | Uhr et al. | |
| 2018/0300382 A1 | 10/2018 | Madisetti et al. | |
| 2018/0331821 A1 | 11/2018 | Gray | |
| 2018/0343339 A1* | 11/2018 | Lotter | H04M 15/41 |
| 2018/0352033 A1* | 12/2018 | Pacella | H04L 67/10 |
| 2019/0042620 A1 | 2/2019 | Garagiola et al. | |
| 2019/0042989 A1 | 2/2019 | Scott | |
| 2019/0188655 A1* | 6/2019 | Pandit | G06Q 20/065 |
| 2019/0238525 A1 | 8/2019 | Padmanabhan et al. | |
| 2019/0266601 A1* | 8/2019 | Allen | G06F 21/645 |
| 2019/0288853 A1* | 9/2019 | Gray | H04L 9/3239 |
| 2019/0303942 A1* | 10/2019 | Balaraman | G06Q 20/4016 |
| 2019/0325038 A1 | 10/2019 | Finlow-bates | |
| 2019/0325044 A1* | 10/2019 | Gray | G06F 16/284 |
| 2019/0353685 A1* | 11/2019 | Almeida Cavoto | G07F 15/003 |
| 2019/0355076 A1* | 11/2019 | Marcinkowski | G06Q 40/02 |
| 2019/0356641 A1* | 11/2019 | Isaacson | G06Q 20/384 |
| 2020/0042971 A1* | 2/2020 | Eby | G06Q 20/065 |
| 2020/0044857 A1* | 2/2020 | Snow | H04L 9/0643 |
| 2020/0058023 A1* | 2/2020 | Travizano | G06Q 20/384 |
| 2020/0058176 A1* | 2/2020 | Pratz | H04L 9/3239 |
| 2020/0082302 A1 | 3/2020 | Zoldi et al. | |
| 2020/0090795 A1 | 3/2020 | Chang et al. | |
| 2020/0092086 A1* | 3/2020 | Raman | H04L 9/0643 |
| 2020/0110813 A1* | 4/2020 | Kamijoh | H04L 9/3239 |
| 2020/0112427 A1* | 4/2020 | Nakamura | G06F 16/2379 |
| 2020/0120039 A1* | 4/2020 | Tabares | H04L 63/10 |
| 2020/0125661 A1 | 4/2020 | Albright et al. | |
| 2020/0145216 A1* | 5/2020 | Clark | H04L 63/12 |
| 2020/0159891 A1* | 5/2020 | Patel | G06F 16/9024 |
| 2020/0167769 A1* | 5/2020 | Green | G06Q 20/389 |
| 2020/0186369 A1* | 6/2020 | Yoshihama | G06F 16/1805 |
| 2020/0193744 A1* | 6/2020 | Pratz | H04L 9/3239 |
| 2020/0211092 A1* | 7/2020 | Sarin | H04L 67/28 |
| 2020/0225649 A1* | 7/2020 | Cahill | H04L 9/3247 |
| 2020/0320530 A1* | 10/2020 | Liu | G06Q 20/0855 |
| 2020/0327546 A1* | 10/2020 | Pennington | G06Q 20/3823 |
| 2020/0334773 A1* | 10/2020 | Spangenberg | G06Q 50/184 |
| 2020/0344233 A1* | 10/2020 | Lai | G06Q 20/065 |
| 2020/0349194 A1* | 11/2020 | Kundu | G06F 16/901 |
| 2020/0351075 A1* | 11/2020 | Griffin | H04N 19/174 |
| 2020/0364703 A1* | 11/2020 | Joveski | G06Q 20/065 |
| 2020/0374106 A1* | 11/2020 | Padmanabhan | H04L 63/0428 |
| 2020/0382301 A1* | 12/2020 | Saket | H04L 63/00 |
| 2020/0387433 A1* | 12/2020 | Wang | G06N 5/043 |
| 2020/0387896 A1* | 12/2020 | Tran | A42B 3/0433 |
| 2020/0389537 A1 | 12/2020 | Mercuri | |
| 2020/0394085 A1* | 12/2020 | Mercuri | G06F 16/2379 |
| 2020/0394175 A1* | 12/2020 | Novotny | G06F 16/2379 |
| 2020/0394220 A1* | 12/2020 | Novotny | H04L 9/0643 |
| 2020/0394552 A1* | 12/2020 | Ganapavarapu | G06N 20/00 |
| 2020/0402114 A1* | 12/2020 | Vukich | G06Q 30/0277 |
| 2020/0410349 A1* | 12/2020 | Katz | A63F 13/67 |
| 2021/0027260 A1* | 1/2021 | Dent-Young | H04L 45/64 |
| 2021/0037013 A1* | 2/2021 | Salkintzis | H04L 63/06 |
| 2021/0042841 A1* | 2/2021 | Floyd | G06Q 50/26 |
| 2021/0056095 A1* | 2/2021 | Srivastava | G06F 16/2379 |
| 2021/0075914 A1* | 3/2021 | Nelson | G06Q 20/32 |

OTHER PUBLICATIONS

"Non Final Office Action Issued in U.S. Appl. No. 16/434,510", dated Jul. 2, 2020, 16 Pages.

"International Search Report and Written Opinion Issued in PCT Application No. PCT/US20/046874", dated Nov. 23, 2020, 11 Pages.

"U.S. Appl. No. 16/434,510", filed Jun. 7, 2019, 33 Pages.

Ateniese, et al., "Redactable Blockchain—or—Rewriting History in Bitcoin and Friends", In Proceedings of IEEE European Symposium on Security and Privacy (EuroS&P), Apr. 26, 2017, pp. 111-126.

"International Search Report and Written Opinion Issued in PCT Application No. PCT/US20/030332", dated Sep. 10, 2020, 12 Pages.

"Final Office Action Issued in U.S. Appl. No. 16/434,510", dated May 21, 2021, 23 Pages.

* cited by examiner

SUBSCRIPTION TO DEPENDENCIES IN SMART CONTRACTS

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. Blockchain systems have also been used for the implementation of smart contracts to automate transactions on the blockchain, including triggering clauses upon specified conditions being met.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to smart contract technology. In one example of the technology, responsive to a smart contract subscription request from a requestor to a first smart contract, a registry entry is added to a first smart contract registry such that the added registry entry includes requestor information associated with the requestor, and subscription information associated with at least one exposed interface of the first smart contract. In some examples, responsive to a change occurring that is associated with at least one exposed interface of the first smart contract, based on the registry, any subscribers to the first smart contract that have a subscription to which the change pertains are determined. In some examples, responsive to determining subscribers to the first smart contract that have a subscription to which the change pertains, the determined subscribers are caused to be notified of the change.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
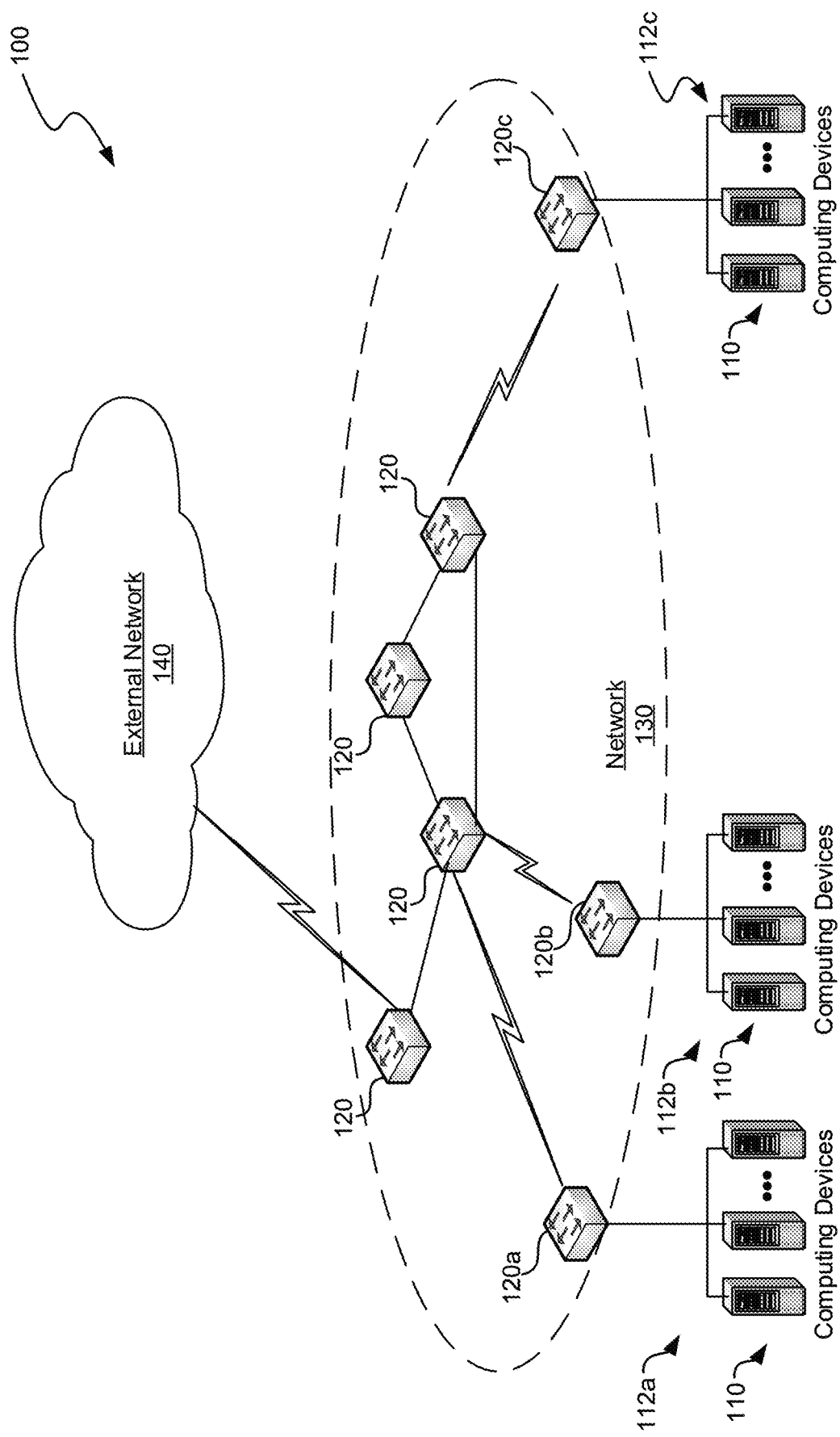
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to smart contract technology. In one example of the technology, responsive to a smart contract subscription request from a requestor to a first smart contract, a registry entry is added to a first smart contract registry such that the added registry entry includes requestor information associated with the requestor, and subscription information associated with at least one exposed interface of the first smart contract. In some examples, responsive to a change occurring that is associated with at least one exposed interface of the first smart contract, based on the registry, any subscribers to the first smart contract that have a subscription to which the change pertains are determined. In some examples, responsive to determining subscribers to the first smart contract that have a subscription to which the change pertains, the determined subscribers are caused to be notified of the change.

In some examples, a smart contract includes computer-executable code that makes use of a distributed ledger to digitally execute one or more agreements and/or transactions between parties. The smart contract may perform, facilitate, verify, and/or enforce the agreements and/or transactions of the smart contract. The smart contract may be entirely on a blockchain, or the smart contract may include some off-chain logic with the state of the smart contract being tracked by a blockchain or other distributed ledger. A smart contract may have one or more associated defined functions that are used to interact with the smart contract. The smart contract may be interacted with by calling one of the defined functions of the smart contract.

In some examples, a smart contract includes functionality that makes it possible for users to subscribe to changes some aspect or aspects of the smart contract, such as subscribing to changes of a property associated the smart contract, or changes to all parameters associated with a function of the smart contract. For instance, for a smart contract that provides a function that determines the credit score of a particular individual, a subscription could be made to a change in the property of the smart contract—that is, the individual's credit score, so that the subscriber is notified of changes in the credit score. Alternatively, a subscription could be made to a change in any parameter associated with a function of a smart contract. For instance, in some examples, if the function for the smart contract that determines an individual's credit score had a parameter for the income of the individual, then if there were a change in the individual's income indicated in the smart contract, then subscribers to the function would be notified to a change to one of the parameters of the function, regardless of whether the individual's credit score changed or not.

In some cases, parameters of a smart contract might naturally change over time, with subscribers being notified of such changes. In other cases, parameters of a smart contract may normally be unchanged parameters indicated by a blockchain. A key characteristic of conventional blockchain implementations is that blockchains have been immutable, e.g., transactions on these prior blockchains cannot be changed. However, contrary to such conventional blockchain implementations, in some examples, an edit transaction (ETX) may be used for editing blockchains. A smart contract may accordingly have a changed parameter based on an ETX transaction.

In some examples, one smart contract may subscribe to another smart contract using the process described above. In other examples, off-chain processes may also subscribe to a smart contract.

In some examples, smart contracts and off-chain processes can subscribe to changes in a function of a smart contract and/or to a property of the smart contract, using a function exposed by the smart contract. In some examples, an identification of the smart contract or off-chain process so subscribed is placed in a registry, including subscription metadata that may indicate the subscriber and the nature of the subscription (such as the name of the function, whether the subscription is to the function or a property of the function, and/or the like), along with possibly other details, such as the address of the subscriber, the duration of the subscription, and/or the like. In some examples, responsive to a property of the smart contract or parameter of a function of the smart contract changing, the smart contract checks the registry to determine whether there are any subscribers that need to be notified of the change. In some examples, responsive to determining that there are subscribers that need to be notified of the change, the smart contract may cause determined subscribers to be notified of the change.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
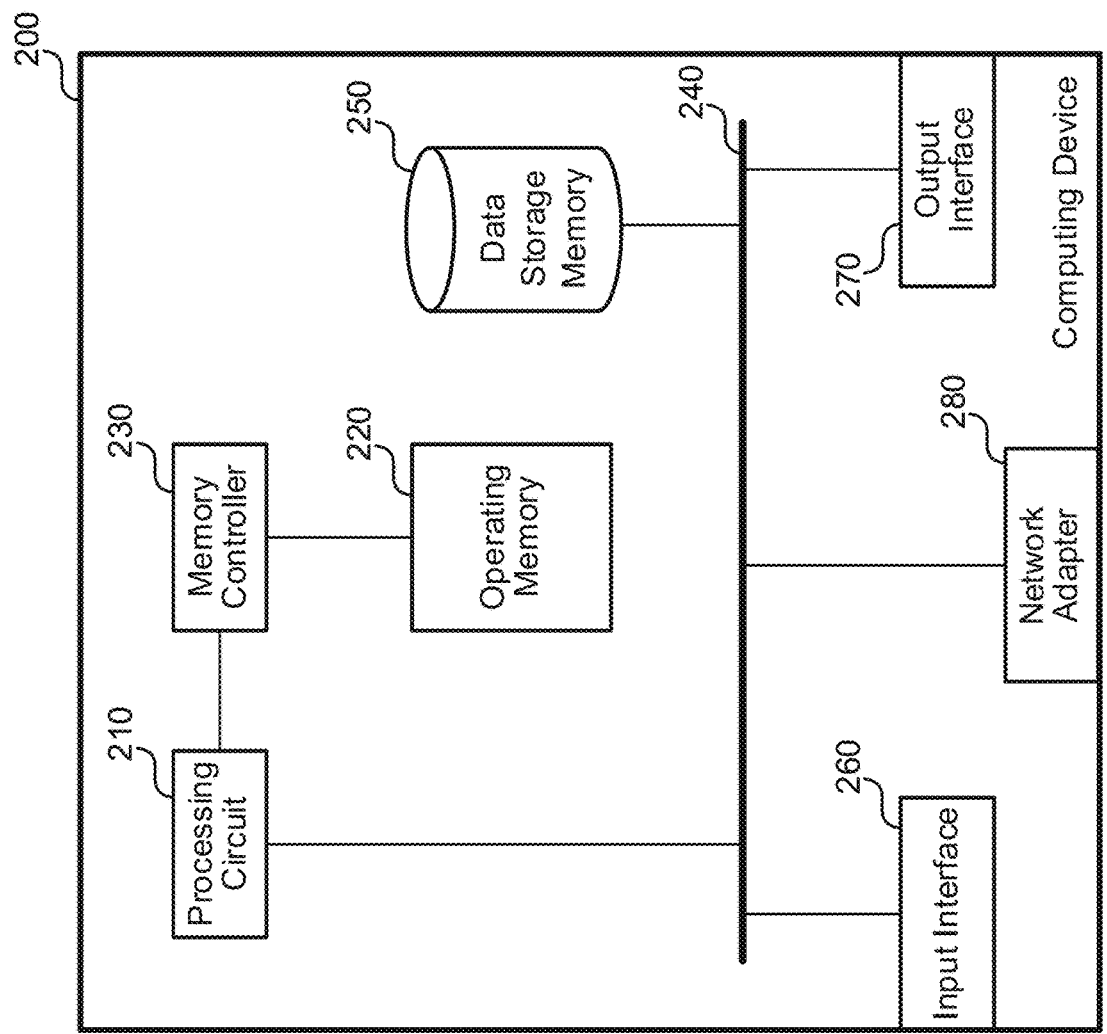
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims, whether used in the singular form or the plural form, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 4:
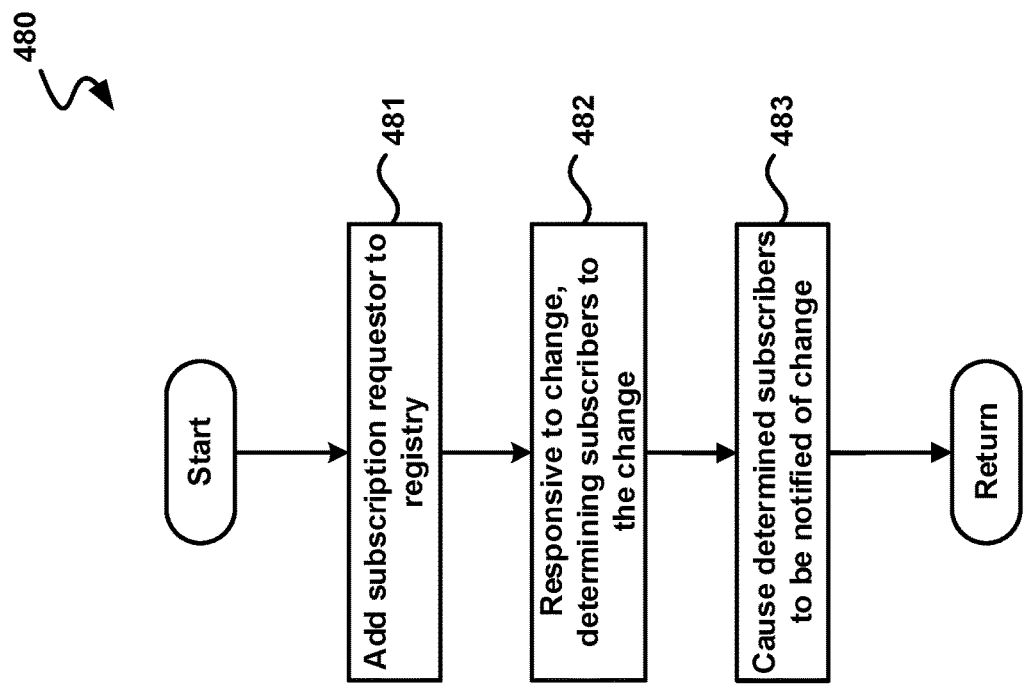
FIG. 4 is a flow diagram illustrating an example process.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions, such as, in some examples, actions described herein, such as the actions of the process of FIG. 4 according to one example.

Illustrative System

Figure 3:
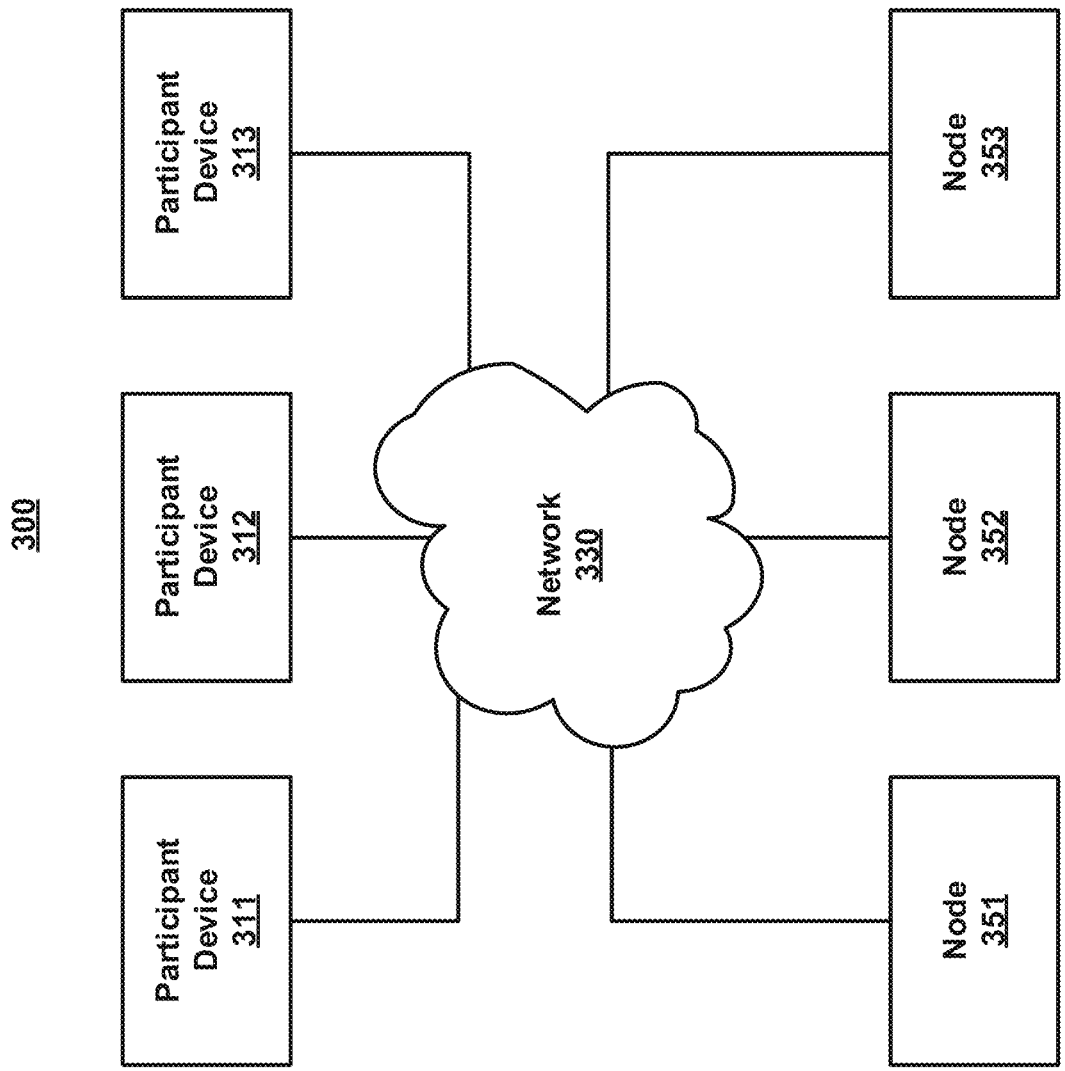
FIG. 3 is a block diagram illustrating an example of a system.

FIG. 3 is a block diagram illustrating an example of a system (300) for a network that includes at least a portion of a blockchain network and devices in communication with the blockchain network. System 300 may include network 330, blockchain nodes 351-353, and participant devices 311-313.

Each of the participant devices 311-313, and/or blockchain nodes 351-353 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel between blockchain nodes 351-353, and participant devices 311-313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

In some examples, participant devices 311-313 are devices used by participants to communicate over network 330, such as to request a transaction, perform functions associated with a smart contract, and/or the like. Such participants may be, for example, any suitable device requesting a transaction on a public blockchain network, such as a wallet application on a network device requesting a transaction on a public blockchain network; a device requesting the initiating of a smart contract or interacting with a smart contract on a blockchain network; a non-member participant device of a consortium blockchain network requesting a transaction; an off-chain device running an off-chain process that interacts with smart contracts and/or blockchain transactions in some manner, and/or the like.

In some examples, blockchain nodes 351-353 are devices that, during normal operation, validate and process submitted blockchain transactions, and execute chaincode. A blockchain node that is creating new blocks is referred to as a miner. In some examples, a miner is capable of performing blockchain edits in response to an edit transaction, upon verification of the edit transaction, and which may further cause notification subscribers of edits to the edited transaction responsive to performing the blockchain edit, as discussed in greater detail below. In some examples, blockchain nodes 351-353 may also perform one or more actions associated with one or more smart contracts, including executing smart contract logic, tracking the state of one or more smart contracts on a blockchain or other distributed ledger, and/or the like.

System 300 may include more or less devices than illustrated in FIG. 3, which is shown by way of example only.

System 300 may include one or smart contracts. Each smart contract may have an associated distributed ledger, such as a blockchain. In some examples, the smart contract executes from code on the distributed ledger, and the state of the smart contract is tracked via the distributed ledger. In some examples, some aspects of the smart contract may be executed off-chain, with the state of the smart contract still being tracked via the distributed ledger. Each smart contract may have one or more associated functions, with the smart contract being interacted with via the functions of the smart contract. In some examples, a requestor, such one of the participant devices 311-313, may call a function, and a node, such as one of the blockchain nodes 351-353, may respond to the function call.

In some examples, at least one of the smart contracts manages a smart contract registry for subscriptions to changes associated with or more exposed interfaces of the smart contract, where each smart contract manages its own smart contract registry. A requestor may make a request for a subscription via a function of the smart contract. The requestor may be, for example, another smart contract, or an off-chain process. Such an off-chain process may be, for instance, a logic application, a logic flow, a web service, an off-chain monitoring process, and/or the like. The exposed interface of the smart contract may be, for example, a function of the smart contract, or a property of the smart contract.

Responsive to a smart contract subscription request from a requestor to the smart contract via the function, the smart contract logic may add a registry entry to the smart contract registry. The registry entry may include, for example, requestor information and subscription information. Requestor information may include information associated with the requestor, such as an address of the requestor. The subscription information may include, for example, the function or property of the smart contract that the subscriber is subscribing to associated changes for, and the type of subscription, such as whether the subscription is for changes to a property of the smart contract, or changes to any parameter of a function of the smart contract. The subscription information may also include other information in some examples, such as the duration of the subscription.

The subscription request may vary in different examples. For instance, in some examples, the request may be a call for a function of a smart contract that has two parameters, one parameter being the property name to which the subscriber wishes to subscriber to, and the second parameter being the address of the subscriber. In other examples, the subscriber request may have more parameters than this, as discussed above, such as a parameter for duration, and/or the like.

The smart contract may maintain the smart contract registry, including responding to requests via at least one function of the smart contract, and adding, changing, or deleting entries to the smart contract registry. Also, whenever a change occurs to one of the parameters of a function of the smart contract or properties of the smart contract, the smart contract logic may check the smart contract registry to determine whether any of the subscribers should be notified of the change, based on which changes the subscribers are subscribed to. For instance, in some examples, if subscribers A and B both have a subscription to changes in a function of that smart contract with a property corresponding to changes in the credit score of individual C, and there is a change in the property of the credit score of individual C in the smart contract, the smart contract will check the registry and determine that subscribers A and B should both be notified of the change in credit score of individual C.

In some examples, a subscriber to parameters of a function of a smart contract would also be notified in the event of the deletion of the function, since deletion of the function is one type of change in the parameters of the function.

Responsive to determining that one or more subscribers should be notified of a change, in some examples, the smart contract logic causes the determined subscribers to be notified of the change. In some examples, the smart registry stores, for each subscriber, means of notifying the subscriber of changes, such as the address of the subscriber. In some examples, the means for notifying the subscriber of changes is part of a valid subscription request in some examples, and is stored in the registry entry for the subscriber responsive to the subscription request being accepted. Responsive to determining that a subscriber should be notified of a change, the smart contract may use the information on the means of notifying the subscriber of changes to cause the subscriber to be notified of the changes.

As discussed above, the changes may be changes in a smart contract that may naturally occur over time, or may be changes that originate from the editing of the blockchain through an edit transaction.

As an example of changes based on an edit transaction, for instance, a smart contract may calculate a user's credit score, based in part on one or more blockchain transactions. For instance, one of these blockchain transaction may indicate the user's reported income. A smart contract that determines the user's credit score may use the user's reported income as one of the parameters of a function of the smart contract that uses, among other things, that user's reported income to determine the user's credit score. A user's income may have been reported in error, and therefore the transaction reporting the income is in error, and may subsequently be edited. In some examples, if a subscriber to the smart contract is subscribed to all parameters of a function of the smart contract that includes the user's reported income, then the subscriber will be notified, by the smart contract, of the changes to the parameter of the user's reported income. In some examples, the subscriber may be notified of suitable information related to the change, such as what was changed, what the old value was, and what the new value is.

The subscribers may include smart contracts, off-chain processes, and/or the like. The protocol discussed above may be used for any suitable blockchain, including public, private, and consortium blockchains.

Various mechanisms may be used to notify subscribers of changes in various examples. In some examples, the mechanism is an event that is emitted by the smart contract to notify the determined subscribers of the change. In other examples, the mechanism is calling a function of each smart contract that is subscribed to the change to notify subscribing smart contracts of the change. In other examples, another suitable mechanism for notifying the determined subscribers of the change is used.

In some examples, the mechanism may vary based on the subscriber, or multiple mechanisms may be used for multiple types of subscribers.

For instance, in some examples, to notify one or more smart contract subscribers of a change, the smart contract at which the change occurred may call a function of the smart contract subscriber at the address indicated in the registry for the smart contract subscriber, where the purpose of the called function is to notify the subscriber of a change associated with a smart contract to which the smart contract is subscribed. In some examples, to notify one or more off-chain processes of a change, the smart contract at which the change occurred may emit an event to which the subscribing off-chain process or processes are listening for. In some examples, a registry entry for a subscription for an off-chain process includes a specific ID that is created at the time of the subscription so that the off-chain process can process changes across multiple smart contracts that the off-chain process is subscribed to.

In some examples, a smart contract may enable a subscription to any property of the smart contract, or to all parameters of any function of the smart contract, or to multiples of the above (a subscription to multiple properties, a subscription to all parameters of multiple functions, and/or the like). In some examples, a subscription to changes to multiple associated exposed interfaces of the smart contract may require multiple function calls, or in some examples may be accomplished with one function call, depending on how the function for the request is set up. When the subscriber is notified of a change, the subscriber may respond accordingly, such as by the subscriber updating the subscriber's information in accordance with the change.

In some examples, a smart contract may enable a subscription to only certain values, such as, in some examples, a set of critical values that are deemed critical for the smart contract to remain valid.

A smart contract may be dependent to other smart contracts, which may be dependent to another smart contract, such that any smart contract may have multiple 0 to N degrees of dependency relationship(s) with other smart contract(s). Critical values that are modified by an authorized user may trigger a revalidation process for each smart contract in the chain of dependency for that particular critical value. Critical values may include the state of a smart contract, the address of smart contract, data value(s) of the smart contract, term(s) in the smart contract, and/or the like. In some examples, the dependencies may enable the values and terms of a smart contract to be modified for validated reasons while safeguarding the validity of a smart contract by tracking and reprocessing modified terms or values.

As an example of dependency relationships, a first smart contract may be used to determine a user's credit score. A second smart contract may be a home loan issued based on the user's credit score, which has a dependency to the first smart contract, and a third smart contract may be a car loan based on the user's credit score, which also has a dependency for the first smart contract. A fourth smart contract may be a home equity line of credit that has a dependency on smart contract for the home loan (where, as discussed, the home loan has a dependency on the credit score smart contract). The first smart contract may be based, among other things, on a reported income of the user as indicated on the blockchain. In some examples, if the reported income is changed based on an edit transaction, then the corresponding parameter changes in the first smart contract, which is then sent to subscribers that subscribed to changes in that parameter. This may result in a change in the smart contract for the home loan, and this change may be sent to the home equity line of credit smart contract based on the subscription of the home equity line of credit smart contract to the home loan smart contract.

Illustrative Subscription Process

FIG. 4 is a diagram illustrating an example dataflow for a process for subscribing to blockchain transaction edits. In some examples, the process of FIG. 4 is performed by one or more blockchain nodes, such as one or more of blockchains nodes 351-353 of FIG. 3.

In the illustrated example, step 481 occurs first. At step 481, in some examples, responsive to a smart contract subscription request from a requestor to a first smart contract, a registry entry is added to a first smart contract registry such that the added registry entry includes requestor information associated with the requestor, and subscription information associated with at least one exposed interface of the first smart contract.

As shown, step 482 occurs next in some examples. At step 482, in some examples, responsive to a change occurring that is associated with at least one exposed interface of the first smart contract, based on the registry, any subscribers to the first smart contract that have a subscription to which the change pertains are determined. As shown, step 483 occurs next in some examples. At step 483, in some examples, responsive to determining subscribers to the first smart contract that have a subscription to which the change pertains, the determined subscribers are caused to be notified of the change. The processing may then proceed to a return block, where other processing is resumed.

Illustrative Edit Transaction (ETX)

As discussed above, changes in the smart contract to which subscriptions based possibly may be based, in some cases, on edit transactions to a blockchain. A key characteristic of conventional blockchain implementations is that blockchains have been immutable, e.g., transactions on these prior blockchains cannot be changed. Among other things, such immutability of prior blockchains is an important characteristic in terms of auditability. If transactions on these prior blockchains could be altered, the integrity of the blockchain would be destroyed and the cryptographic techniques for verifying the blockchain transaction would not function as designed.

However, contrary to such conventional blockchain implementations, in some examples, an edit transaction (ETX) may be used for editing blockchains. The edit transaction may interchangeably be referred to as an edit transaction, edit blockchain transaction, or ETX. Changes in the smart contract to which subscriptions based possibly may be based, in some cases, on edit transactions to a blockchain.

Figure 5A:
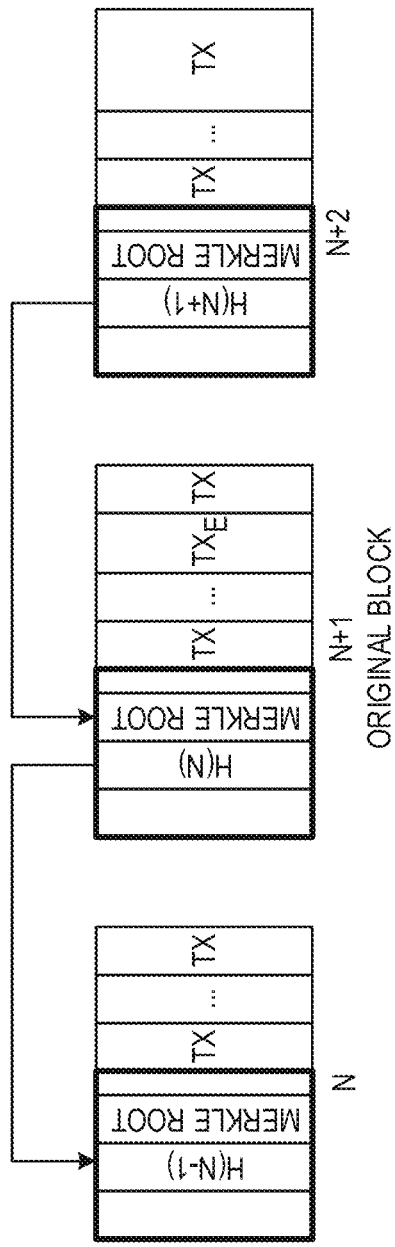
FIGS. 5A and 5B illustrate an example of a blockchain edit.
Figure 5B:
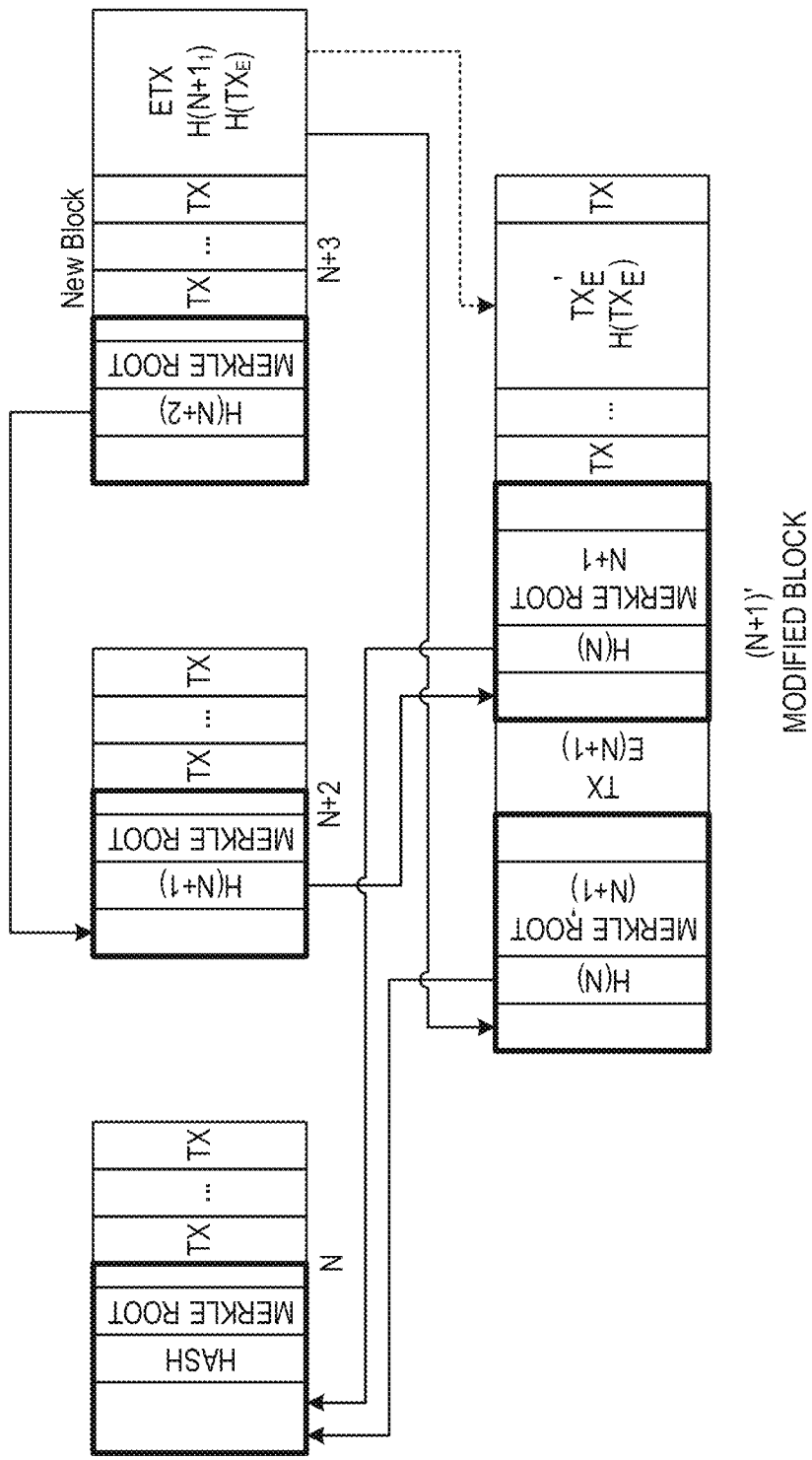

The details of an example of a blockchain edit are discussed in greater detail with regard to FIGS. 5A and 5B.

FIGS. 5A and 5B illustrate an example of a blockchain edit. FIG. 5A illustrates an example of the original block (OB) to be edited by an edit transaction (ETX) on its original blockchain. In this example, the OB is block N+1. FIG. 5A also illustrates an example of the block preceding the OB in the blockchain (block N) and a block (block N+2) that includes an ETX transaction to edit the OB. In some examples, the ETX transaction is initiated via an API call.

FIG. 5B shows an example of the result after the ETX is performed, where a modified block (MB) of the OB, as the modified version of block N+1 (N+1)' is created, along with a new block (N+3) including a reference to the edit transaction.

Blockchains may have several characteristics that make them valuable foundations for many scenarios, including decentralized operation, security, and immutability. Immutability may be a double-edged sword, however. A blockchain's cryptographic linkage of transactions may mean that any modification to existing records destroys the integrity of the chain and is immediately apparent. However, there can be legitimate requirements for removal of data from a blockchain. Privacy regulations like General Data Protection Regulation (GDPR) may present a legal requirement to be able to delete personally-identifiable information (PII) on-request. While blockchain architectural guidance recommends storing any PII off-chain, that can add significant complexity to a design and undermine the properties that building on a blockchain strives to provide.

Further, blockchains, even ones with limited capabilities for storing arbitrary data, may be susceptible to the storage of illicit, questionable, and even illegal content. Researchers recently discovered that the public Bitcoin blockchain (BTC) stores encoded images of child pornography and dark-web links to sites hosting such images. Even in tightly controlled private and consortium blockchains where there is little of risk of questionable content, it may be desirable to remove data that was inadvertently placed on the chain. The blockchain may also include errors.

The agreement by the network as to what content should be deleted may vary in various example. In some examples, the network uses a trusted central authority such as a government agency, consortium of stakeholders, or independent entity created solely for that purpose. For example, an international group of organizations involved with expertise in identifying child pornography could submit edit requests to the network that mining nodes would honor because of their origin.

In some examples, the network votes to agree to proposed edits using built-in capabilities like smart contracts. The approach that a network takes may vary based on the network's governance model, and can even vary within a network based on the types of content deemed editable.

In some examples, an edit transaction (ETX) specifies one or more transactions already on the chain to be edited, such as by, in some examples, listing the hashes of the transaction(s) to be edited in the body of the ETX transaction. Some examples of ETX transactions may also be capable of deleting transaction outputs. Further, in some examples, there may be types of edit transactions that request deletion of a smart contracts or inputs to smart contract requests.

To ensure that smart contract state remains intact after an edit, the edit protocol can include one or more snapshot(s) of impacted state in the edited transaction that is stored in the MB. A node could calculate a smart contract's state by executing the smart contract using its transaction inputs up to the edited transaction, then merging the calculated smart contract state with the snapshot.

In the example illustrated in FIG. 5A, the original block (OB) includes a transaction to be edited that is denoted $TX_E$, with the other, non-edited transactions denoted TX. The OB may also include a hash of its preceding block H(N), and a merkle root.

An edit transaction (ETX) may be received to edit block $TX_E$ in original block OB. First, in some examples, a miner determines whether the ETX transaction is valid. The determination that ETX transaction is valid may be a determination that the ETX is both correctly formed and that the network's governance system agrees to the edit. Upon determining that the ETX is valid, in some examples, the miner creates modified versions (MB) of each original block (OB) to be edited, as well as a new block (NB) that includes a reference to the ETX transaction, as shown in FIG. 5B. In some examples, the miner mines both the MBs and NB together, meaning that if the consensus protocol is proof-of-work, the hashes of both the MB and NB headers are both included in the reference.

In some examples, the MB structure differs from that of any type of block other than another MB. In some examples, the MB contains a special transaction that contains an exact copy of OB, with edited version(s) of the edited transaction(s). In the place of any edited transaction, in some examples, the MB includes the hash of the original transaction. In order to recreate the integrity of the chain, in some examples, the MB has its own header which links it to the hash of the block (block N) preceding the edited block, and that includes the merkle root of the MB itself.

Figure 6A:
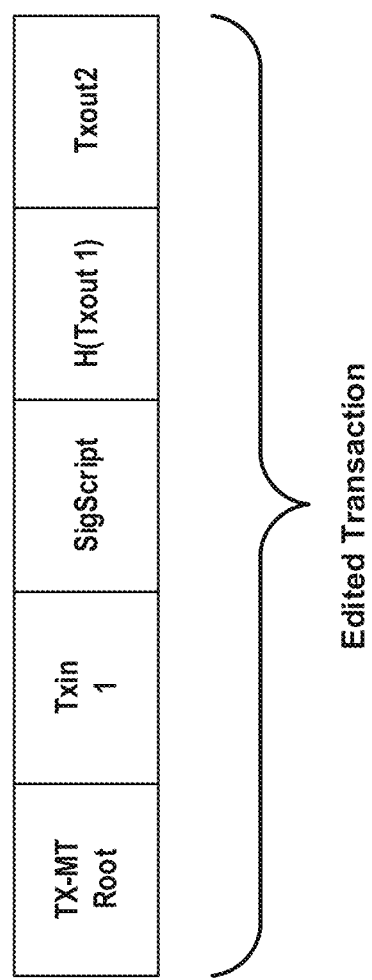
FIG. 6A illustrates an example of an edited transaction.

The MB may also include the header from OB, including the hash of the block preceding the original block H(N) and the merkle root of the OB. In some example, an edited transaction, such as depicted in FIG. 6A, includes the original portions of the transaction, plus the hashes of the fields that are deleted. Using the hashes in the MB along with dynamically-calculated hashes of the other transactions, in some examples, other nodes can recreate the original merkle tree root of edited and original transactions, use those recreated transaction merkle tree roots to recreate the merkle tree root of the MB, and compare the calculated block root with the one stored in the OB header that is included in the MB. In some examples, a match means the node can validate the edit, e.g., by determining what data was modified or deleted, and by validating that the edited information is only that which is specified in the ETX.

As discussed above, in some examples, in order to recreate the integrity of the chain, the MB has its own header which links it to the hash of the block (block N) preceding the edited block, though proof-of-work checks cannot be performed solely on an MB, but require all the MBs and NB since they are mined together. An example of the reference in the NB includes hashes of the MBs to strongly link the NB to the corresponding MB, but the NB header links to the most recent block like any other block being added to the chain.

In some examples, a node that receives a NB validates that the blocks are valid and that it approves of the edits according to the governance policies it adheres to, as follows in some examples.

First, the node checks that consensus prerequisites are met. For example, in the case of Bitcoin and Ethereum, this involves checking that the combined hashes of the NB and MBs demonstrate the required amount of work (the hash is smaller than the current network target). In addition to validating the standard transactions in the NB, and that the NB header includes the hash of the most recent block, the node validates that the transaction hashes match transactions that are in the OBs corresponding to the MBs. Then, the node validates that the copied versions of the OBs in the MBs differ only by the approved edits of the target transactions. The node also validates that the hash stored in edited transactions, in combination with the hashes of the other transactions in the MB, result in the merkle root value stored in the OB header (of which there is a copy in the MB). In response to completing these validations, the node accepts the NB as the highest block, and the MBs as the edits of the OBs. The node may then delete the OBs.

In some examples, nodes that bootstrap after MBs have been accepted by the network will not see OBs, only MBs. In some examples, when such nodes request an MB from the network, the network responds with the NB that points at it, as well as the other MBs referenced by that NB. In some examples, that enables the node to validate the blocks that make up the edit. In some examples, if the node receives an OB for which there is an MB, the node cannot determine whether the network majority agrees to the MB, the node accepts the OB. For MBs that the network majority accepted, in some examples, the node will eventually construct a chain built on the MBs that has more work than any minority fork that does not include the MBs. Accordingly, in some examples, network consensus for chains with MBs is identical to standard consensus based on the longest chain (chain that demonstrates the most work) winning.

Figure 6B:
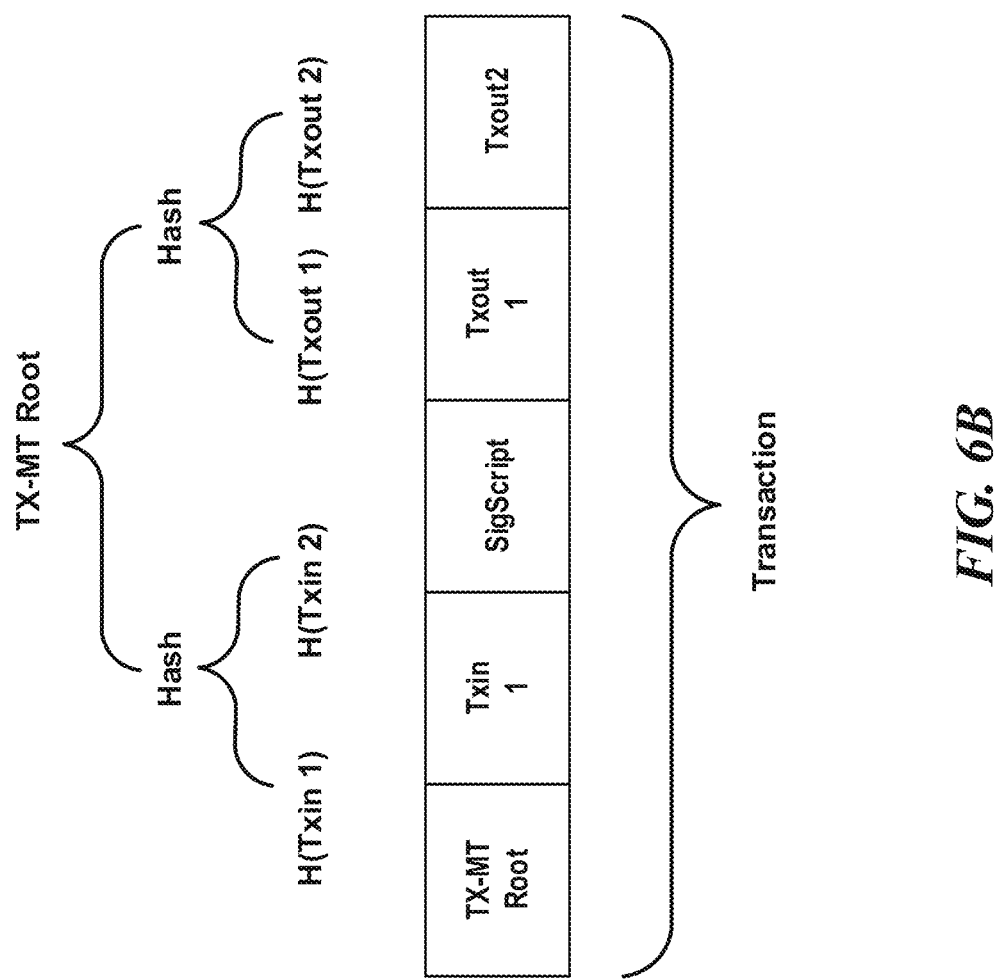
FIG. 6B illustrates an example of a transaction and an associated merkle root, in accordance with aspects of the present disclosure.

FIG. 6B illustrates a blockchain that supports an edit protocol that hashes individual transaction fields and creates a transaction merkle tree (TX-MT) from the hashes. Such a blockchain may accommodate targeted deletion of specific transaction fields. For example, such a blockchain may be used if only a subset of the outputs are invalid and others represent legitimate transfers referenced in derivative transactions that should be preserved.

The network may use a transaction's TX-MT root as the transaction's hash and ID. This should increase the number of hashes that execute when validating a blockchain by O(10) on a typical network where transactions have O(10) inputs and outputs for each transaction. This approach to deriving transaction hashes enables an ETX to specify which portions of a transaction are edited by storing the merkle tree root of the transaction, as well as the hashes of edited transaction fields, e.g., in the body of the ETX.

After the transaction is edited, as the final step of the edit transaction (ETX) process, in some examples, the subscription registry is checked to determine whether there are any subscribers to edits associated with the transaction that was edited. If so, subscription metadata may be retrieved for the determined subscribers. The subscription metadata may include, for each subscriber, an indication of the subscriber, an address of the subscriber, and/or other suitable information for the subscriber.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
responsive to a smart contract subscription request from a requestor to a first smart contract, adding a registry entry to a first smart contract registry such that the added registry entry includes requestor information associated with the requestor, and subscription information associated with at least one exposed interface of the first smart contract;
responsive to a change occurring that is associated with at least one exposed interface of the first smart contract, determining, based on the registry, any subscribers to the first smart contract that have a subscription to which the change pertains; and
responsive to determining subscribers to the first smart contract that have a subscription to which the change pertains, causing the determined subscribers to be notified of the change.

2. The apparatus of claim 1, wherein the smart contract subscription request includes an address of the subscriber, and wherein the requestor information of the added registry entry to the first smart contract registry includes the address of the subscriber.

3. The apparatus of claim 1, wherein the requestor information at least one entry in the first smart contract registry includes an address of the subscriber for the entry, and wherein causing the determined subscribers to be notified of the change is accomplished based at least in part on the address of the subscriber.

4. The apparatus of claim 1, wherein the smart contract subscription request includes an identification of a property of the first smart contract for which changes are being subscribed to.

5. The apparatus of claim 1, wherein the smart contract subscription request includes an identification of a function for the first smart contract for which changes in any parameters of the function are being subscribed to.

6. The apparatus of claim 1, wherein the determined subscribers include a second smart contract.

7. The apparatus of claim 6, wherein causing the determined subscribers to be notified of the change includes causing a function of the second smart contract to be called notifying the second smart contract of the change.

8. The apparatus of claim 1, wherein the determined subscribers include a first off-chain process.

9. The apparatus of claim 8, wherein causing the determined subscribers to be notified of the change includes causing an event to be emitted to which the first off-chain process is monitoring.

10. A method, comprising:
maintaining first smart contract registry for a first smart contract, such that the first smart contract registry includes registry entries of subscribers to changes associated with the first smart contract, and such that each registry entry includes requestor information associated with the subscribed requestor, and subscription information associated with at least one exposed interface of the first smart contract;
in response to a change occurring that is associated with at least one exposed interface of the first smart contract, based on the first contract registry, retrieving, from the first contract registry, requestor information associated with any subscribers to the first smart contract that, according to the registry, have a subscription to which the change pertains; and
in response retrieving the requestor information, causing the subscribers to which the change pertains to be notified of the change.

11. The method of claim 10, wherein the subscribers to which the change pertains include a second smart contract.

12. The method of claim 11, wherein causing the subscribers to which the change pertains to be notified of the change includes causing a function of the second smart contract to be called notifying the second smart contract of the change.

13. The method of claim 10, wherein the subscribers to which the change pertains include a first off-chain process.

14. The method of claim 13, wherein causing the subscribers to which the change pertains to be notified of the change includes causing an event to be emitted to which the first off-chain process is monitoring.

15. A processor-readable storage medium, having stored thereon processor-executable code that, upon execution by at least one processor, enables actions, comprising:
responsive to a change occurring that is associated with at least one exposed interface of a first smart contract, determining, based on a first smart contract registry of a first smart contract, any subscribers to the first smart contract that have a subscription to which the change pertains; and
responsive to determining subscribers to the first smart contract that have a subscription to which the change pertains, causing the determined subscribers to be notified of the change.

16. The processor-readable storage medium of claim 15, the actions further comprising,
maintaining the first smart contract registry such that the first smart contract registry includes registry entries of subscribers to changes associated with the first smart contract, and such that each registry entry includes requestor information associated with the subscribed requestor, and subscription information associated with at least one exposed interface of the first smart contract.

17. The processor-readable storage medium of claim 15, wherein the determined subscribers include a second smart contract.

18. The processor-readable storage medium of claim 17, wherein causing the determined subscribers to be notified of the change includes causing a function of the second smart contract to be called notifying the second smart contract of the change.

19. The processor-readable storage medium of claim 15, wherein the determined subscribers include a first off-chain process.

20. The processor-readable storage medium of claim 19, wherein causing the determined subscribers to be notified of the change includes causing an event to be emitted to which the first off-chain process is monitoring.

* * * * *